United States Patent [19]

Butz

[11] Patent Number: 5,632,520
[45] Date of Patent: May 27, 1997

[54] CARGO-RESTRAINING APPARATUS FOR MOTOR VEHICLE

[75] Inventor: Peter Butz, Langenfeld, Germany

[73] Assignee: Peter Butz GmbH & Co. Verwaltungs-KG, Langenfeld, Germany

[21] Appl. No.: 549,628

[22] Filed: Oct. 27, 1995

[30] Foreign Application Priority Data

Nov. 3, 1994 [DE] Germany .......................... 44 38 910.8

[51] Int. Cl.$^6$ .................... B60R 5/04; B60P 7/14
[52] U.S. Cl. .......................... 296/24.1; 410/118; 410/129; 410/142; 296/37.1; 296/37.16
[58] Field of Search .................... 410/117, 118, 410/121, 129, 140, 142; 296/24.1, 37.1, 37.15, 37.14, 37.16; 220/530, 531; 224/402, 403, 311, 925

[56] References Cited

U.S. PATENT DOCUMENTS

| | | | |
|---|---|---|---|
| 3,891,263 | 6/1975 | Orsulak | 296/24.1 |
| 4,277,097 | 7/1981 | Lalanne | 296/37.16 |
| 4,502,674 | 3/1985 | White et al. | 296/37.16 X |
| 4,688,842 | 8/1987 | Arbenius | 296/24.1 |
| 4,919,467 | 4/1990 | Guimelli | 296/24.1 |
| 5,011,208 | 4/1991 | Lewallen . | |
| 5,090,856 | 2/1992 | Moore | 410/118 |
| 5,167,479 | 12/1992 | Bott | 410/121 |
| 5,211,718 | 5/1993 | Gotz et al. | 296/37.16 X |
| 5,257,846 | 11/1993 | Kanai et al. | 296/37.14 |
| 5,288,122 | 2/1994 | Pilhall | 296/24.1 |

FOREIGN PATENT DOCUMENTS

| | | | |
|---|---|---|---|
| 258823A | 3/1988 | European Pat. Off. | 296/37.16 |
| 2401799 | 3/1979 | France . | |
| 2645479 | 10/1990 | France . | |
| 3332695 | 3/1985 | Germany . | |
| 3635992 | 5/1987 | Germany . | |
| 4010209 | 10/1991 | Germany . | |
| 4239470 | 5/1994 | Germany . | |
| 4322434 | 9/1994 | Germany . | |
| 9417435 | 2/1995 | Germany . | |
| 193949 | 8/1986 | Japan | 296/37.16 |
| 3-287422 | 12/1991 | Japan | 296/24.1 |
| 438052 | 11/1967 | Switzerland | 296/37.1 |
| 1588292 | 4/1981 | United Kingdom | 296/37.16 |

Primary Examiner—Karen B. Merritt
Assistant Examiner—Stephen Gordon
Attorney, Agent, or Firm—Herbert Dubno; Andrew Wilford

[57] ABSTRACT

A motor vehicle having a passenger compartment provided with pair of passenger seats and a luggage compartment behind the seats and having a floor has a cargo-restraining apparatus provided with a support defining a horizontal pivot axis at the floor in the luggage compartment immediately behind the seats. A rigid panel has an inner edge pivoted at the pivot axis on the support and an outer edge and has oppositely directed faces extending between the edges. The panel is movable between an erect position in which it is substantially vertical with its outer edge level with upper ends of the seats and a recumbent position lying on the floor with one of its faces directed upward and forming a cargo-support surface in the luggage compartment. An elongated housing on the panel normally contains a flexible retaining sheet that is extensible from the housing to restrain cargo in the luggage compartment.

8 Claims, 1 Drawing Sheet

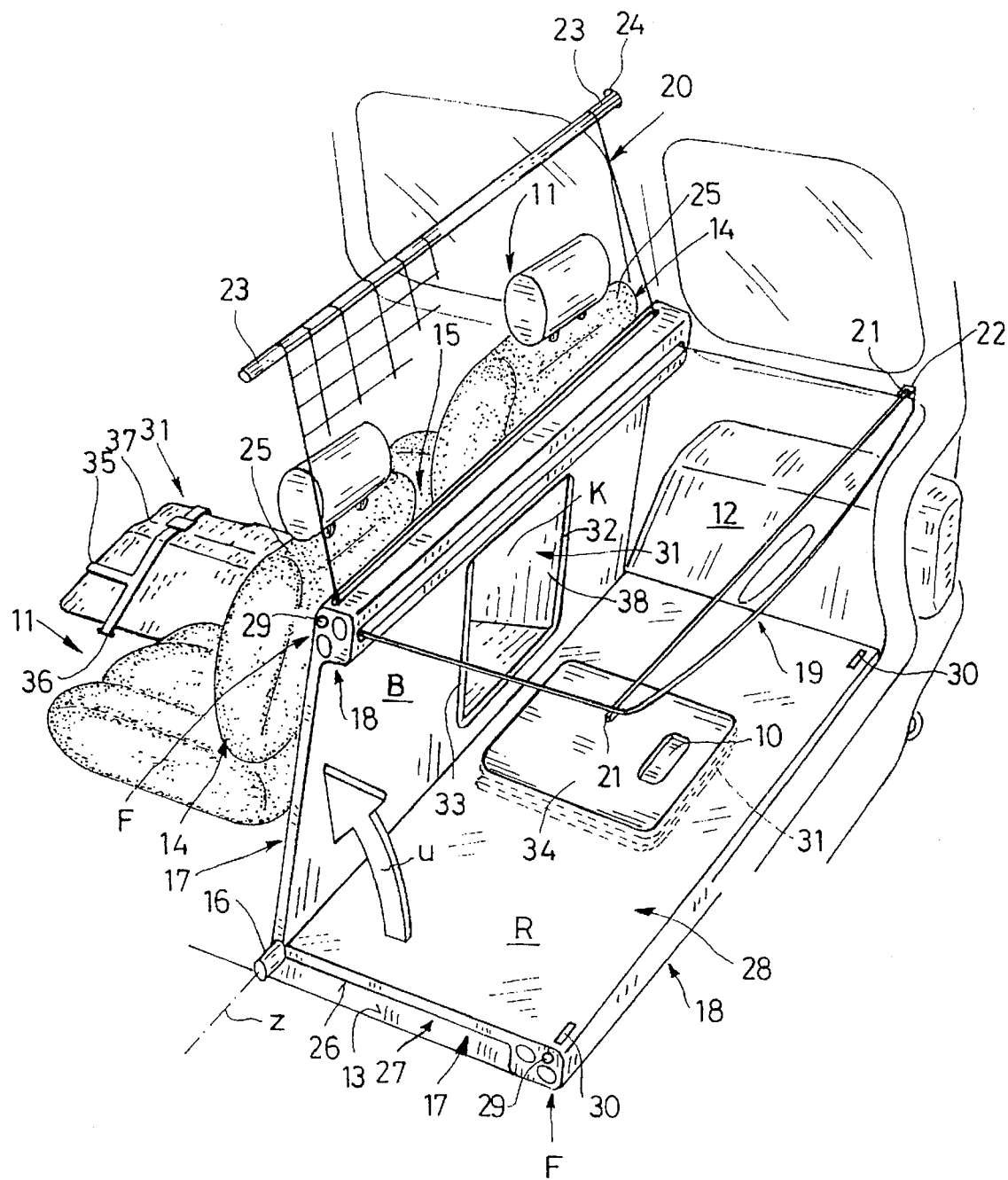

CARGO-RESTRAINING APPARATUS FOR MOTOR VEHICLE

FIELD OF THE INVENTION

The present invention relates to a cargo-restraining apparatus or holddown for a motor vehicle. More particularly this invention concerns an apparatus for holding down or back objects being transported in a passenger vehicle.

BACKGROUND OF THE INVENTION

It is standard to provide a passenger vehicle, in particular a van, station wagon, utility vehicle, or the like, with an apparatus that prevents objects stowed in the compartment behind the passenger seats from bouncing about or spilling forward into the front passenger compartment. In particular German patent document 4,010,209 of E. Ament describes an arrangement where a transversely elongated housing mounted immediately behind the upper portions of the seat backs holds a rolled up net whose free end is secured to a bar. This bar can be pulled up and hooked in holders near the vehicle roof so as to stretch the net tight between the housing and the bar. Any objects that are propelled forward, for instance during a sudden braking operation, are caught by the net and prevented from moving forward into the passenger compartment. This system is fairly bulky when not in use.

In French patent 2,645,479 of A. Tong-Cuong a rack is movable between a recumbent position seated in a complex grooved recess formed in the floor of the luggage compartment, and a standing position immediately behind the vehicle seats. Such a system is fairly effective and easy to use. The recess it sits in however traps dirt and, whether the rack is seated in it or not, presents an uneven surface that does not make it easy to slide objects into or out of the storage compartment.

German patent 4,322,434 of O. Brand et al shows a net arrangement for use around the sleeping area behind the seats in a tractor-trailer cab. The edge of the net is secured to a large U-shaped structure that can be pivoted up or down to deploy the net. Once again, when not in use this system is bulky and unattractive.

German patent document 4,239,470 of P. Butz discloses a net that can be pulled like a window shade out of a housing mounted in the floor at the front end of the luggage compartment, that is immediately behind the seats. The free end of the net is secured to a rod that can either be attached directly above the housing to deploy the net vertically and thereby protect the passengers from cargo moving forward out of the luggage compartment, or can be pulled back and secured down to hold down objects in the luggage compartment. This system is fairly effective but requires that the luggage compartment be specially constructed to accommodate the floor-mounted housing.

OBJECTS OF THE INVENTION

It is therefore an object of the present invention to provide an improved apparatus for controlling cargo in a luggage compartment of a passenger vehicle.

Another object is the provision of such an improved apparatus for controlling cargo in a luggage compartment of a passenger vehicle which overcomes the above-given disadvantages, that is which is easy to use and which does not present an encumbrance when not in use.

A further object is to provide such an apparatus which can protect the passengers against forwardly moving objects and can also hold down or hide objects on the luggage-compartment floor.

SUMMARY OF THE INVENTION

A motor vehicle having a passenger compartment provided with pair of passenger seats and a luggage compartment behind the seats having a floor has a cargo-restraining apparatus provided with a support defining a horizontal pivot axis at the floor in the luggage compartment immediately behind the seats. According to the invention a rigid panel has an inner edge pivoted at the pivot axis on the support and an outer edge and has oppositely directed faces extending between the edges. The panel is movable between an erect position in which it is substantially vertical with its outer edge level with upper ends of the seats and a recumbent position lying on the floor with one of its faces directed upward and forming a cargo-support surface in the luggage compartment. An elongated housing on the panel normally contains a flexible retaining sheet that is extensible from the housing to restrain cargo in the luggage compartment.

With this system, therefore, when the panel is in the recumbent position it takes up virtually no useful space. It lies on the floor of the luggage compartment and, if desired, cargo can be stacked on it. When erected it provides a solid barrier behind the seats so that any cargo is safely confined and cannot move forward to bump the seats or get through any space between bucket seats. The sheet can be deployed as a cargo holddown or a compartment partition if necessary.

According to another feature of the invention the housing is at the upper edge of the panel. In addition the panel is formed with a central throughgoing window and is provided with a flexible bag-like container having an open end secured to one of the faces around the window so that elongated objects can be pushed through the window into the bag for stowage in the erect position of the panel. The seats define a gap communicating between the passenger and luggage compartments. The window is aligned with the space for extension of the container through the gap into the passenger compartment. The container is compactable into a space defined by the window between the panel faces and by the floor in the recumbent position. Thus this container can be used to hold skis or the like, allowing them to project through into the passenger compartment without actually contacting the passengers. Furthermore in the event of a violent maneuver, the elongated objects will not be free to rattle around and create a safety hazard. An elongated cover can be secured over the window in the recumbent position so that panel presents a smooth surface in the closed position and the container has a closed end fixed to the cover so that it is reinforced and the cover does not get lost. Normally the cover is provided with feet that hold the cover with the container extended back between the seats into the luggage compartment.

The sheet according to this invention can be a net having a free end and the vehicle is provided with means for holding the net free end above the outer edge in the erect position. It can also have an outer edge and the vehicle can be provided with means for holding the sheet free end level with the outer edge but therebehind in the erect position. In fact both such arrangements can be used at the same time.

BRIEF DESCRIPTION OF THE DRAWING

The above and other objects, features, and advantages will become more readily apparent from the following description, reference being made to the accompanying drawing whose sole FIGURE is a partly schematic and perspective view of the apparatus of this invention in a motor vehicle.

SPECIFIC DESCRIPTION

As seen in the drawing a passenger vehicle has a front passenger compartment F provided with a pair of bucket seats 11 each having a seat back 14 and separated by an open gap 15 and a rear luggage compartment R having a floor 13 extending horizontally between a pair of wheel wells 12. A pair of supports 16 at the extreme front end of the luggage compartment R define a horizontal pivot axis z extending perpendicular to a normal vehicle travel direction D. A rigid panel 17 having a front face 28 and a back face 26 is pivoted on these supports 16 about the axis z and can move as shown by arrow U between an erect position shown in solid lines and a recumbent position shown in dashed lines. Latches 29 operated by finger pulls 30 can fit in unillustrated seats in the vehicle interior to secure the panel 17 in the erect position.

This panel 17 has a thickened outer edge forming a housing 18 that normally contains a shade-like pullout cover 19 (here shown transparent for clarity of view but normally opaque) and a similar shade-like pullout mesh 20. The cover 19 has at its reinforced free end laterally projecting pins 21 that can fit in seats 22 in the rear end of the rear compartment R level with the housing 18 in the erect condition of the panel 17 so that the cover 19 hides and contains any luggage sitting on the floor 13. The housing 18 lies level with or slightly below upper edges 25 of the seats 11 in the erect position of the panel 17 to contain anything sitting on the floor 13 and keep it out of contact with the seats 11. The net 20 has its upper or outer edge secured to a rod 23 whose ends can similarly be set in seats 24 above the housing 18 in the erect position of the panel 17 so that this net 20 can prevent anything in the rear luggage compartment R from moving forward into the front passenger compartment F, as for instance during braking.

When in the recumbent position the lower or back face 26 of the panel 17 defines a space 27 with the floor 13. The panel 17 is centrally formed with a square window or aperture 38 provided with a peripheral frame 32 to which is secured an open end of a flexible bag 31. This bag 31 can be compacted and fitted into the space 27 under the panel 17 in the recumbent position. A closed front end 37 of the bag 31 is held in a frame 35 having feet 33 that can be seated in holes 36 in the passenger compartment F. Thus when the panel 17 is erect the bag 31 can be pulled forward through the gap 15 and the feet 33 seated in the holes 36 to stretch it tight and form a compartment or passage K that is intended to contain elongated objects like skis or fishing poles. The aperture 38 is normally closed on the front side 28 with a cover 34 that has a handle 10 and that allows luggage or the like to be set atop the down panel 17 without getting caught in the aperture 38. The cover 34 can be fixed to the front closed end 37 of the bag 31 to reinforce it and prevent the cover 34 from getting lost when the bag 31 is deployed.

I claim:

1. In combination with a motor vehicle having a passenger compartment provided with a pair of passenger seats, and a luggage compartment behind the seats having a floor, a cargo-restraining apparatus comprising:

support means defining a horizontal pivot axis fixed at the floor in the luggage compartment immediately behind the seats;

a rigid panel having
      an inner edge pivoted at the pivot axis on the support means,
      an outer edge, and
      oppositely directed front and back faces extending between the edges, the panel being movable independently of the seats between an erect position with its faces generally vertical and with its outer edge level with upper ends of the seats and a recumbent position lying on the floor with its front face directed upward and forming a cargo-support surface in the luggage compartment, the front face being rigid and continuous;

latch means on the vehicle offset from the axis for releasably retaining the outer edge of the panel in the erect position thereof;

an elongated housing on the outer edge of the panel;

a flexible retaining sheet having a free end and being normally held in the elongated housing but extensible therefrom to restrain cargo in the luggage compartment; and means in the vehicle offset from the outer edge in the erect position of the panel for engaging and retaining the free end of the sheet.

2. The combination defined in claim 1 wherein the panel is formed with a central throughgoing window, the apparatus further comprising a removable rigid cover releasably secured over and closing the window in the recumbent position, and a flexible bag-like container having an open end secured to one of the faces around the window, whereby elongated objects can be pushed through the window into the bag for stowage in the erect position of the panel.

3. The combination defined in claim 2 wherein the container is compactable into a space defined by the window between the one panel face and by the floor in the recumbent position.

4. The combination defined in claim 1 wherein the container has a closed end fixed to the cover.

5. The combination defined in claim 1 wherein the sheet is a net having the free end and the means for engaging and holding, holds the net free end above the outer edge in the erect position.

6. The combination defined in claim 1 wherein the means for engaging and holding holds the sheet free end level with the outer edge but therebehind in the erect position.

7. In combination with a motor vehicle having a passenger compartment provided with a pair of passenger seats, and a luggage compartment behind the seats having a floor, the seats defining a gap communicating between the passenger and luggage compartments, a cargo-restraining apparatus comprising:

support means defining a horizontal pivot axis at the floor in the luggage compartment immediately behind the seats;

a rigid panel formed with a central throughgoing window, having an inner edge pivoted at the pivot axis on the support means and an outer edge, and having oppositely directed faces extending between the edges, the panel being movable between an erect position in which it is substantially vertical with its outer edge level with upper ends of the seats and a recumbent position lying on the floor with one of its faces directed upward and forming a cargo-support surface in the luggage compartment, the window being aligned with the gap for extension of the container through the gap into the passenger compartment;

a flexible bag-like container having an open end secured to one of the faces around the window, whereby elongated objects can be pushed through the window into the bag for stowage in the erect position of the panel an elongated housing on the panel; and a flexible retaining sheet normally held in the elongated housing but extensible therefrom to restrain cargo in the luggage compartment.

8. In combination with a motor vehicle having a passenger compartment provided with a pair of passenger seats, and a luggage compartment behind the seats having a floor, the seats defining a gap communicating between the compartments, a cargo-restraining apparatus comprising:

support means defining a horizontal pivot axis at the floor in the luggage compartment immediately behind the seats;

a rigid panel formed with a window aligned with the gap, having an inner edge pivoted at the pivot axis on the support means and an outer edge, and having oppositely directed faces extending between the edges, the panel being movable between an erect position in which it is substantially vertical with its outer edge level with upper ends of the seats and a recumbent position lying on the floor with one of its faces directed upward and forming a cargo-support surface in the luggage compartment;

a removable cover secured over the window in the recumbent position;

a flexible bag-like container compactable into a space defined by the window between the one panel face and the floor in the recumbent position and having an open end secured to one of the faces around the window and a closed end fixed to the cover, whereby elongated objects can be pushed through the window into the bag for stowage in the erect position of the panel;

an elongated housing on the panel;

a flexible retaining sheet normally held in the elongated housing but extensible therefrom to restrain cargo in the luggage compartment; and means in the passenger compartment for holding the cover with the container extended back between the seats into the luggage compartment.

* * * * *